(12) United States Patent
Kagitani et al.

(10) Patent No.: US 8,729,152 B2
(45) Date of Patent: May 20, 2014

(54) CURING AGENT COMPOSITION

(75) Inventors: Masahiko Kagitani, Toyohashi (JP); Hitoshi Funada, Toyohashi (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/263,368

(22) PCT Filed: Apr. 7, 2010

(86) PCT No.: PCT/JP2010/056326
§ 371 (c)(1), (2), (4) Date: Oct. 7, 2011

(87) PCT Pub. No.: WO2010/117022
PCT Pub. Date: Oct. 14, 2010

(65) Prior Publication Data
US 2012/0043694 A1 Feb. 23, 2012

(30) Foreign Application Priority Data

Apr. 10, 2009 (JP) .................. 2009-096217

(51) Int. Cl.
*B22C 9/00* (2006.01)
(52) U.S. Cl.
USPC ............................ 523/139; 264/219; 525/397
(58) Field of Classification Search
USPC ....................................................... 523/139
See application file for complete search history.

(56) References Cited

U.S. PATENT DOCUMENTS 6,232,368 B1 * 5/2001 White .......................... 523/145

FOREIGN PATENT DOCUMENTS

| EP | 0789064 A2 | 8/1997 |
|---|---|---|
| JP | 5-200481 A | 8/1993 |
| JP | 6-277791 A | 10/1994 |
| JP | 7-308732 A | 11/1995 |
| JP | 8-164439 A | 6/1996 |
| JP | 09-104803 A | 4/1997 |
| JP | 11-33670 A | 2/1999 |
| JP | 2005-186117 A | 7/2005 |

OTHER PUBLICATIONS

International Search Report dated Jul. 13, 2010 for PCT/JP2010/056326.
International Preliminary Report on Patentability, and Translation of Written Opinion of the International Searching Authority, dated Nov. 24, 2011, for International Application No. PCT/JP2010/056326 (Forms PCT/IB/338, PCT/IB/373 and PCT/ISA/237).

* cited by examiner

*Primary Examiner* — Nicole M Buie-Hatcher
*Assistant Examiner* — Chelsea M Lowe
(74) *Attorney, Agent, or Firm* — Birch, Stewart, Kolasch & Birch, LLP

(57) ABSTRACT

A curing agent composition for a water-soluble phenol resin used to produce a mold, which comprises a branched ester compound that is derived from a carboxylic acid having a branched chain, and an alcohol, and has 5 to 13 carbon atoms.

15 Claims, No Drawings

CURING AGENT COMPOSITION

TECHNICAL FIELD

The present invention relates to a curing agent composition for a water-soluble phenol resin used to produce a mold, and a mold-producing process using this composition.

BACKGROUND ART

As a mold-producing method for producing a mold, such as a master mold or a core, by use of a binder, the self-hardening mold producing process has been known. In the field of engineering casting, and other fields around the central field, in particular, the organic self-hardening mold producing process has already been become a generally used mold producing process instead of the inorganic self-hardening mold producing process from the viewpoint of productivity, casting-quality, and safety and hygiene. As the organic self-hardening mold producing process, known is a mold producing process of hardening a binder containing a water-soluble phenol resin with an ester compound.

Patent Document 1 suggests a binder composition, for organic-ester-curing foundry sand, wherein a phenol compound monomer is incorporated into a water-soluble phenol resin in a specified proportion, whereby the bench life can be extended without lowering the final strength of the mold. In Patent Document 1, as examples of the organic ester, the following are described: cyclic ester compounds, such as lactones, and ester compounds derived from a carboxylic acid having a linear structure and an alcohol.

Patent Document 2 suggests a curing agent composition in which an organic ester having active carbon is incorporated, thereby making it possible to give a high mold strength, and further capture effectively formaldehyde generated in the production process. In the curing agent composition in Patent Document 2 also, a phenol compound monomer is incorporated in order to extend the bench life without lowering the final strength of the mold. Moreover, besides the active-carbon-having organic ester, an organic ester for curing the water-soluble phenol resin is also incorporated therein. The active-carbon-having organic ester, and the organic ester for curing the water-soluble phenol resin, which are described in Patent Document 2, are each an ester compound derived from a carboxylic acid having a linear structure and an alcohol, or a cyclic ester compound such as a lactone.

PRIOR ART DOCUMENTS

Patent Documents

Patent Document 1: JP-A-6-277791
Patent Document 2: JP-A-11-33670

SUMMARY OF THE INVENTION

Problems to be Solved by the Invention

Any environment where castings are produced is exposed to the temperature of the air all the year around. Moreover, molds (sand molds) for producing castings are under a situation that the molds are exposed to heat by casting, and repeatedly reused. Thus, a reclaimed sand obtained by the recovery of a mold used once for casting (substance in a state that a mold is returned into a sand form after used for casting) rises in temperature, in particular, in summer. Accordingly, the curing reaction of the water-soluble phenol resin therein is excessively promoted so that the bench life of the mixed sand tends to become short. As a result, for example, the following problems are easily caused, in particular, in summer: the operability of the mixed sand when the sand is put into a wooden flask, and the like is deteriorated; and the final strength of the mold is declined.

According to Patent Documents 1 and 2 described above, a phenol compound monomer such as resorcin is incorporated into a curing agent composition, and the like, thereby extending the bench life. However, only by the incorporation of the phenol compound monomer, the effect of extending the bench life has not yet been insufficient; thus, in particular, when the temperature of the air is high in summer, and the like, the bench life is not sufficiently kept with ease.

The present invention provides a curing agent composition in which the bench life can be sufficiently kept without lowering the final strength of the mold; and a process for producing a mold by using this composition.

Means for Solving the Problems

The curing agent composition of the present invention is a curing agent composition for a water-soluble phenol resin used to produce a mold, which comprises a branched ester compound that is derived from a carboxylic acid having a branched chain, and an alcohol, and has 5 to 13 carbon atoms.

The process of the present invention for producing a mold is a mold-producing process of putting, into a pattern, a mixture obtained by adding a curing agent composition and a water-soluble phenol resin to a foundry sand, and shaping the mixture, wherein the curing agent composition is the curing agent composition of the present invention, and when the mixture is put in the pattern, the temperature of the mixture is 30° C. or higher.

Effects of the Invention

According to the curing agent composition of the present invention, an ester compound that has, in a moiety originating from a carboxylic acid in the skeleton thereof, a branched chain, and has 5 to 13 carbon atoms (hereinafter the compound may be referred to as a branched ester compound) is contained as a curing component; thus, the composition makes it possible to adjust the period for curing a water-soluble phenol resin into an appropriate range. In this way, the bench life can be sufficiently kept without lowering the final strength of the mold. In other words, the curing agent composition of the present invention makes it possible to improve the operability of the mixed sand when the sand is put into any pattern without lowering the final strength of the mold.

EMBODIMENTS FOR CARRYING OUT THE INVENTION

The curing agent composition of the present invention is used in a mold producing process for curing a water-soluble phenol resin with an ester compound, and contains a branched ester compound that is derived from a carboxylic acid having a branched chain, and an alcohol, and has 5 to 13 carbon atoms. The branched chain of the branched ester compound is preferably a branched alkyl group or a branched alkylene group from the viewpoint of the final strength and the handleability. Hereinafter, the components and other components contained in the curing agent composition of the present invention will be described.

<Branched Ester Compound>

The curing agent composition of the present invention contains the branched ester compound in order to keep the bench life sufficiently without lowering the final strength of the mold. This branched ester compound has 5 to 13 carbon atoms. In order to keep the bench life sufficiently, the compound has preferably 6 or more carbon atoms, more preferably 7 or more carbon atoms. From the viewpoint of the mold strength, the compound has preferably 10 or less carbon atoms. From the above-mentioned viewpoints, the branched ester compound has preferably 6 to 13 carbon atoms, more preferably 7 to 10.

The branched chain of the branched ester compound has preferably 1 to 4 carbon atoms, more preferably 1 to 2 from the viewpoint of the mold strength.

The number of ester bonds in the branched ester compound is preferably from 1 to 5, more preferably from 1 to 2, even more preferably 2 from the viewpoint of the mold strength. The branched ester compound may be a partially esterified compound or a completely esterified compound, and is preferably a completely esterified compound from the viewpoint of the mold strength.

The branched-chain-having carboxylic acid for producing the branched ester compound has preferably 4 to 12 carbon atoms, more preferably 5 to 10, even more preferably 6 to 8 carbon atoms from the viewpoint of sufficient keeping of the bench life, and the mold strength. From the same viewpoints, the branched-chain-having carboxylic acid preferably has, at the α-position of the carbonyl group thereof, its branch. More preferably, the carbon at the α-position is bonded to three carbon atoms including the carbon atom of the carbonyl group, and a hydrogen atom.

The alcohol for producing the branched ester compound has preferably 1 to 4 carbon atoms, more preferably 1 to 3 carbon atoms, even more preferably 1 to 2 carbon atoms from the viewpoint of sufficient keeping of the bench life, and the mold strength. From the same viewpoints, the alcohol is preferably a monohydric alcohol. From the same viewpoints, the alcohol is preferably a linear alcohol.

A preferred structure of the branched ester compound is a structure represented by the following general formula (I):

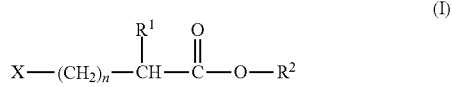

(I)

wherein n is an integer of 1 to 7, X is H or $R^3OCO$—, and $R^1$, $R^2$ and $R^3$, which may be the same or different, are each an alkyl group having 1 to 4 carbon atoms.

In the general formula (I), n is preferably an integer of 1 to 5 from the viewpoint of sufficient keeping of the bench life, and the mold strength. $R^1$, $R^2$ and $R^3$ are each preferably an alkyl group having 1 to 2 carbon atoms from the viewpoint of sufficient keeping of the bench life, and the mold strength.

Specific examples of the branched ester compound include dimethyl 2-ethylsuccinate, dimethyl 2-methylglutarate, dimethyl 2-methyladipate, methyl 2-ethylhexanoate, ethyl 2-ethylhexanoate, dimethyl 2-methylsebacate, dimethyl 2-ethylazelate, diethyl 2-ethylglutarate, dimethyl 2-(n-propyl)glutarate, diethyl 2-(n-butyl)succinate, dimethyl 2-(n-butyl)succinate, diethyl 2-methylpimelate, and dimethyl 2-methylsuberate; and mixtures thereof. Particularly preferred are dimethyl 2-ethylsuccinate, dimethyl 2-methylglutarate, and dimethyl 2-methyladipate since the period for curing a water-soluble phenol resin can be adjusted into a more appropriate range. From the viewpoint of sufficient keeping of the bench life, and the mold strength, preferred are dimethyl 2-ethylsuccinate, dimethyl 2-methylglutarate, and dimethyl 2-methyladipate, more preferred are dimethyl 2-methylglutarate, and dimethyl 2-methyladipate, and even more preferred is dimethyl 2-methyladipate. From an economical viewpoint, and the viewpoint of a high availability, preferred are dimethyl 2-ethylsuccinate, and dimethyl 2-methylglutarate, and more preferred is a mixture of dimethyl 2-ethylsuccinate and dimethyl 2-methylglutarate.

The content by percentage of the branched ester compound in the curing agent composition is preferably 10% or more by weight, more preferably 25% or more by weight, even more preferably 50% or more by weight from the viewpoint of sufficient keeping of the bench life.

<Different Ester Compound> the curing agent composition of the present invention may be made only of the branched ester compound. A different ester compound, however, may be incorporated thereinto, as a curing component, to such a degree that the advantageous effects of the present invention are not damaged. The different ester compound may be an ester compound having, in the molecule thereof, 1 to 5 ester bonds. The ester compound is, for example, one or more ester compound species selected from cyclic ester compounds, ester compounds each derived from a carboxylic acid having a linear structure and an alcohol, and inorganic esters. Concrete examples thereof include organic esters such as γ-butyrolactone, propiolactone, ε-caprolactone, ethyl formate, ethylene glycol diacetate, diethylene glycol diacetate, triethylene glycol diacetate, ethylene glycol monoacetate, triacetin, ethyl acetoacetate, dimethyl succinate, dimethyl glutarate, and dimethyl adipate; inorganic esters such as ethylene carbonate, and propylene carbonate; and mixtures thereof.

In order to maintain the bench life, it is preferred that the curing agent composition of the present invention does not contain the different ester compound. When the curing agent composition of the present invention contains the different ester compound, the content by percentage thereof in the curing agent composition is preferably 95% or less by weight, more preferably from 10 to 95% by weight, even more preferably from 10 to 80% by weight from the viewpoint of an improvement in the final strength. When the content by percentage is in the range, the ester compound can be caused to exhibit a function as a component for curing a water-soluble phenol resin to such a degree that the advantageous effects of the present invention are not damaged.

When the curing agent composition of the present invention contains the different ester compound, the ratio by weight of the branched ester compound to the different ester compound is preferably from 1/99 to 99/1, more preferably from 1/49 to 49/1, even more preferably from 1/20 to 20/1, even more preferably from 1/20 to 5/1 from the viewpoint of maintaining the bench life and keeping the final strength.

When the curing agent composition of the present invention contains the different ester compound, from the viewpoint of maintaining the bench life, the ratio by weight of the branched ester compound to the different ester compound is preferably from 1/99 to 99/1, more preferably from 1/10 to 10/1, even more preferably from 1/5 to 5/1, even more preferably from 1/1 to 5/1.

When the curing agent composition of the present invention contains the different ester compound, from the viewpoint of keeping the final strength, the ratio by weight of the branched ester compound to the different ester compound is preferably from 1/99 to 99/1, more preferably from 1/10 to 10/1, even more preferably from 1/5 to 5/1, even more preferably from 1/5 to 1/1.

<Phenol Compound Monomer>

The curing agent composition of the present invention may contain a phenol compound monomer. This manner makes it possible to extend the bench life without lowering the final strength of the mold even when the temperature of the air is high (when the temperature is, for example, 40° C. or higher). The reason why the incorporation of the phenol compound monomer into the curing agent composition of the present invention makes it possible to extend the bench life without lowering the final strength of the mold is presumed as follows: the co-existence of the phenol compound monomer and the branched ester compound delays the activation and polymerization of a water-soluble phenol resin based on ester hydrolysis so that the bench life is extended; and further the activated phenol compound monomer is unified into the water-soluble phenol resin so that the final strength of the mold is not lowered. These preferred effects are remarkable when the temperature of the mixture of the curing agent composition, the water-soluble phenol resin and foundry sand is relatively high, that is, 30° C. or higher. When the temperature is 40° C. or higher, even more, 45° C. or higher, the effects are more remarkable.

Examples of the phenol compound monomer include phenol, cresol, xylenol, cumylphenol, nonylphenol, butylphenol, phenylphenol, ethylphenol, octylphenol, amylphenol, naphthol, resorcin, bisphenol A, bisphenol F, bisphenol C, catechol, hydroquinone, pyrogallol, and phloroglucin; and mixtures thereof. Use may be made of a resorcin residue, a bisphenol A residue, or a substituted phenol such as chlorophenol, dichlorophenol, and the like. When the curing agent composition favorably contains resorcin or bisphenol A, or more favorably contains resorcin, a synergetic effect thereof with the branched ester compound makes it possible to extend the bench life further without lowering the final strength of the mold.

When the curing agent composition of the present invention contains the phenol compound monomer, the ratio by weight of the phenol compound monomer to the branched ester compound is preferably from 1/99 to 9/1, more preferably from 3/97 to 8/2, even more preferably from 5/95 to 7/3.

When the curing agent composition of the present invention contains the phenol compound monomer, the content by percentage thereof in the curing agent composition is preferably from 1 to 30% by weight, more preferably from 2 to 20% by weight from the viewpoint of extending the bench life without lowering the final strength of the mold. From the viewpoint of extending the bench life, the content by percentage of the phenol compound monomer in the curing agent composition is preferably 1% or more by weight, more preferably 2% or more by weight. From the viewpoint of maintaining the final strength, the content by percentage of the phenol compound monomer in the curing agent composition is preferably 30% or less by weight, more preferably 20% or less by weight.

<Other Components>

An alkyl silicate having an alkyl group having 1 to 8 carbon atoms or a lower condensate thereof (condensation degree: 1 to 10) may be incorporated into the curing agent composition of the present invention in order to improve the fluidity of the mixed sand. The addition amount of the alkyl silicate or the lower condensate is preferably from 2 to 20 parts by weight, more preferably from 3 to 15 parts by weight for 100 parts by weight of the ester compound (s) including the branched ester compound. Besides, additives such as a perfume and a surfactant may be added thereto to such a degree that the advantageous effects of the present invention are not damaged. The addition amount of these additives is preferably from 0.001 to 20 parts by weight for 100 parts by weight of the ester compound(s) including the branched ester compound.

The curing agent composition of the present invention is suitable for a process for producing a mold by use of a binder containing a water-soluble phenol resin. In other words, the process of the present invention for producing a mold is a mold-producing process of putting, into a pattern, a mixture (having a temperature of 30° C. or higher) obtained by adding the curing agent composition of the present invention and a water-soluble phenol resin to a foundry sand, and shaping the mixture.

In the mold-producing process of the present invention, a new sand or a reclaimed sand may be used as the foundry sand. In order to make use of the advantageous effects of the present invention effectually, it is preferred to use a reclaimed sand as the foundry sand since heat that the reclaimed sand receives is accumulated in the reclaimed sand.

The foundry sand may be a natural sand or an artificial sand. Examples of the natural sand include silica sand, which is made mainly of quartz, chromite sand, zircon sand, olivine sand, alumina sand, and the like. Examples of the artificial sand include synthetic mullite sand, $SiO_2/Al_2O_3$ based foundry sand, $SiO_2/MgO$ based foundry sand, and foundry sand originating from slag, and the like. The artificial sand denotes not any naturally produced foundry sand but any foundry sand obtained by adjusting components of metal oxides artificially, and then melting or sintering the adjusted components.

The reclaimed sand usable in the present invention is a sand obtained by using a mold shaped by use of a water-soluble phenol resin to produce a casting, breaking the mold to produce sand grains, and then subjecting the sand grains to an ordinary reused treatment (in a wet, dry, thermal manner, and the like) one or more times. A sand reclaimed in the dry manner (in particular, an abrading manner) is preferred since the manner gives a high yield to result in economical efficiency. The reclamation may be performed by a combination of two or more of these reused manners.

From the viewpoint of an improvement in the strength of the mold, about the reclaimed sand usable in the present invention, the loss on ignition (LOI) thereof is preferably from 0.1 to 10% by weight, more preferably from 0.2 to 5% by weight, even more preferably from 0.2 to 1% by weight, even more preferably from 0.2 to 0.5% by weight. The LOI denotes the ratio of a decrease in the weight (of the sand) when the sand has been heated at 500° C. in the air for 2 hours.

The water-soluble phenol resin usable in the mold-producing process of the present invention is a resin curable with an ester compound, and is generally a resin yielded by polycondensing a phenol compound and an aldehyde compound under an alkaline condition. Examples of the phenol compound include phenol, bisphenol A, bisphenol F, cresol, 3,5-xylenol, resorcin, catechol, nonylphenol, p-tert-butylphenol, isopropenylphenol, phenylphenol, other phenols that may each be substituted, and mixtures each composed of various phenol compounds, such as a cashew nut shell liquid. These examples may be used alone or in the form of a mixture of two or more thereof when a mold is produced. Examples of the aldehyde compound include formaldehyde, furfural, glyoxal, and the like, which may be used alone or in the form of a mixture of two or more thereof. These compounds may each be used in the form of an aqueous solution if necessary. The following may be blended therewith: a monomer condensable with the aldehyde compound, such as urea, melamine cyclohexanone, and the like; a monohydric alcohol compound, such as methanol, ethanol, isopropyl alcohol, n-propyl alcohol, or butyl alcohol, and the like; a water-soluble polymer such as a polyacrylic acid salt, a cellulose derivative polymer, polyvinyl alcohol or a lignin derivative; and the like.

The alkali catalyst usable to synthesize the water-soluble phenol resin may be a hydroxide of an alkali metal, such as LiOH, NaOH or KOH, and is in particular preferably NaOH or KOH. These alkali catalysts may be used in the form of a mixture.

In the synthesis of the water-soluble phenol resin, the ratio by mole of the aldehyde compound to the phenol compound is preferably from 1.0 to 6.0, more preferably from 1.1 to 5.5. The ratio by mole of the alkali catalyst to the phenol compound is preferably from 0.2 to 5.0, more preferably from 0.5 to 4.0.

In the present invention, the solid content by percentage in the water-soluble phenol resin (the solid content by percentage after the resin is dried at 105° C. for 3 hours) is preferably from 25 to 90% by weight, more preferably from 30 to 85% by weight. The weight-average molecular weight (Mw) of the water-soluble phenol resin is preferably from 500 to 8000, more preferably from 800 to 5000 from the viewpoint of the mold strength.

The weight-average molecular weight (Mw) of any water-soluble phenol resin may be measured by GPC (gel permeation chromatography) under the following conditions:

<Method for Measuring the Weight-Average Molecular Weight of any Water-Soluble Phenol Resin>

(a) Sample preparation: To a sample is added ion exchange water having a weight equal to that of the sample, and thereto is added 0.1% by weight of $H_2SO_4$ to neutralize the liquid. The produced precipitation is filtrated to be separated, washed with water, and then dried. This is dissolved into tetrahydrofuran (THF) to prepare a sample for GPC.

(b) Columns: Use is made of a column GUARD COLUMN TSX (manufactured by Tosoh Corp.) HXL (6.5 mm in diameter×4 cm), a column TSK3000HXL (7.8 mm in diameter×30 cm), and a column TSK2500HXL (7.8 mm in diameter×30 cm). To the inlet (in a device for GPC) are connected the GUARD COLUMN, the 3000HXL, and the 2500HXL in this order from the inlet side.

(c) Standard substance: polystyrene (manufactured by Tosoh Corp.)

(d) Eluent: THF (flow rate: 1 $cm^3$/min.)

(e) Column temperature: 25° C.

(f) Detector: ultraviolet spectrophotometer (quantitative analysis at a wavelength of an ultraviolet absorption maximum peak of phenol)

(g) Sharing method for molecular weight calculation: time-sharing (2 sec.)

In the present invention, a mold is produced from a mixture (mixed sand) in which the curing agent composition of the present invention and a water-soluble phenol resin are added to a foundry sand. At this time, the mold can be produced by use of a conventional self-hardening mold-producing process. The temperature of the mixed sand is usually from about −10 to 50° C. when the sand is put into a pattern. When the mixed sand is 30° C. or higher, a conventiona: curing agent composition makes the bench life short. According to the curing agent composition of the present invention, however, the mixed sand can be used in the state that the bench life is maintained even when the temperature of the mixed sand is 30° C. or higher. Thus, when the curing agent composition of the present invention is used, the temperature of the mixed sand is preferably 30° C. or higher, more preferably 40° C. or higher, even more preferably 45° C. or higher when the mixed sand is put into a pattern. In the mold-producing process of the present invention, it is preferred that a phenol compound monomer is further incorporated into the curing agent composition in order to improve the final strength of the mold, and keep the bench life sufficiently.

From the viewpoint of the mold strength, the content of the curing agent composition in the mixed sand is preferably from 0.01 to 5 parts by weight, more preferably from 0.1 to 3 parts by weight for 100 parts by weight of the mixed sand. About the content of the water-soluble phenol resin in the mixed sand, the content of the solid thereof is preferably from 0.1 to 10 parts by weight, more preferably from 0.5 to 5 parts by weight for 100 parts by weight of the foundry sand from the viewpoint of the mold strength, workability, odor, and costs. Examples of the method for yielding the mixed sand include a method of adding the individual components to a batch mixer, and mixing the components with each other therein, and a method of supplying the individual components into a continuous mixer, and mixing the components with each other therein.

In order to improve the strength of the resultant mold in the present invention, a glycol and/or an ether alcohol may be blended with the mixed sand. Examples of the glycol include diethylene glycol, triethylene glycol, polyethylene glycol, dipropylene glycol, and tripropylene glycol. Examples of the ether alcohol include ethylene glycol monomethyl ether, diethylene glycol monomethyl ether, and diethylene glycol monobutyl ether. The blend amount of the compound(s) is preferably from 1 to 30 parts by weight, more preferably from 5 to 20 parts by weight for 100 parts by weight of the water-soluble phenol resin (in terms of the solid amount of the resin).

In the present invention, other additives, such as a silane coupling agent and urea, may be blended with the mixed sand. Examples of the silane coupling agent include γ-(2-amino)propylmethyldimethoxysilane, γ-aminopropyltrimethoxysilane, γ-aminopropyltriethoxysialne, γ-glycidoxypropyltrimethoxysilane, N-β(aminoethyl)γ-aminopropylmethyldimethoxysilane, and the like. The blend amount of the silane coupling agent is preferably from 0.001 to 10 parts by weight, more preferably from 0.02 to 1 part by weight for 100 parts by weight of the water-soluble phenol resin (in terms of the solid amount of the resin).

The mold-producing process of the present invention is suitable for forming molds for producing nonferrous alloy castings such as aluminum castings, steel castings, or iron castings. However, the process is not limited in usage in casting.

EXAMPLES

Hereinafter, a description will be made about examples demonstrating the present invention concretely. About each example shown in Table 1, the temperature of the atmosphere when a mixed sand thereof was put into a pattern, and that of the atmosphere when the compression strength thereof was evaluated were each set to 35° C. at 55% RH; and about each example shown in Table 2, the same temperatures were each set to 45° C. at 55% RH. About each of the examples shown in Table 1, the temperature of the mixed sand when the mixed sand was put into the pattern was 35° C.; and about each of the samples shown in Table 2, the same temperature was 45° C.

Into 100 parts by weight of KAKETU FUSEN (transliterated) No. 5 sand were incorporated 1.5 parts by weight of a water-soluble phenol resin ("Kao STEP SL-6010", manufactured by Kao-Quaker Co., Ltd.), and 0.3 part by weight of each curing agent composition shown in Tables 1 and 2, and then these components were kneaded to yield each mixed sand and put into a pattern to be shaped into a test piece (50 mm×50 mm in diameter). The two types of the mixed sand, which were used in the putting into the pattern, were the mixed sand just after the kneading, and the mixed sand after the kneaded components were allowed to stand still after 40 minutes (the atmosphere temperature was equal to that when the sand was put into the pattern). About each of the test pieces after 48 hours elapsed from the shaping into the test piece, the compression strength was measured at a compression rate of 5 mm/sec. The compression strength was defined as the value obtained by dividing the burdened load by the sectional area of the test piece.

branched chain, and an alcohol, there was hardly a difference in compression strength between the shaped product in which the mixed sand just after the kneading was used, and that in which the mixed sand after the 40-minute-standing was used. By contrast, in each of Comparative Examples 1 to 4, the compression strength of the shaped product in which the mixed sand after the 40-minute-standing was used was remarkably lower than that of the shaped product in which the mixed sand just after the kneading was used. From this result, it was verified that the present invention makes it possible to keep a sufficient bench life without lowering the final strength of the mold. From the comparison of Example 8 with Examples 9 and 10 in Table 2, it was verified that a synergetic

TABLE 1

| | Component in curing agent composition (a numerical value in parentheses following the component is the % by weight concentration in the curing agent composition) | | | Compression strength (MPa) | |
|---|---|---|---|---|---|
| | Branched ester compound | Different ester compound | Phenol compound monomer | Mold shaped from mixed sand just after kneading | Mold shaped from mixed sand after 40-minute-standing from kneading |
| Example 1 | Dimethyl 2-methylglutarate (100) | — | — | 1.7 | 1.6 |
| Example 2 | Dimethyl 2-methylglutarate (92.5) | — | Resorcin (7.5) | 1.8 | 1.7 |
| Example 3 | Dimethyl 2-methyladipate (100) | — | — | 1.9 | 1.8 |
| Example 4 | Dimethyl 2-methylglutarate (50) | Dimethyl glutarate (50) | — | 1.9 | 1.4 |
| Example 5 | Dimethyl 2-methylglutarate (25) | Dimethyl glutarate (75) | — | 2.3 | 1.3 |
| Example 6 | Dimethyl 2-ethylsuccinate (10) & dimethyl 2-methylglutarate (71) | Dimethyl adipate (19) | — | 2.0 | 1.6 |
| Example 7 | Dimethyl 2-ethylsuccinate (9.3) & dimethyl 2-methylglutarate (65.7) | Dimethyl adipate (17.5) | Resorcin (7.5) | 2.0 | 1.7 |
| Comparative Example 1 | — | Dimethyl glutarate (100) | — | 2.5 | 0.0 |
| Comparative Example 2 | — | Dimethyl glutarate (92.5) | Resorcin (7.5) | 2.1 | 0.8 |

TABLE 2

| | Component in curing agent composition (a numerical value in parentheses following the component is the % by weight concentration in the curing agent composition) | | | Compression strength (MPa) | |
|---|---|---|---|---|---|
| | Branched ester compound | Different ester compound | Phenol compound monomer | Mold shaped from mixed sand just after kneading | Mold shaped from mixed sand after 40-minute-standing from kneading |
| Example 8 | Dimethyl 2-methylglutarate (100) | — | — | 3.0 | 2.5 |
| Example 9 | Dimethyl 2-methylglutarate (92.5) | — | Resorcin (7.5) | 3.4 | 3.1 |
| Example 10 | Dimethyl 2-methylglutarate (92.5) | — | Bisphenol A (7.5) | 3.4 | 2.6 |
| Example 11 | Dimethyl 2-methyladipate (100) | — | — | 3.3 | 2.8 |
| Example 12 | Dimethyl 2-methylglutarate (50) | Dimethyl glutarate (50) | — | 3.4 | 2.4 |
| Example 13 | Dimethyl 2-methylglutarate (25) | Dimethyl glutarate (75) | — | 3.5 | 2.2 |
| Example 14 | Dimethyl 2-ethylsuccinate (10) & dimethyl 2-methylglutarate (71) | Dimethyl adipate (19) | — | 3.4 | 2.6 |
| Example 15 | Dimethyl 2-ethylsuccinate (9.3) & dimethyl 2-methylglutarate (65.7) | Dimethyl adipate (17.5) | Resorcin (7.5) | 3.5 | 2.7 |
| Comparative Example 3 | — | Dimethyl glutarate (100) | — | 3.5 | 0.0 |
| Comparative Example 4 | — | Dimethyl glutarate (92.5) | Resorcin (7.5) | 3.7 | 0.2 |

As is shown in Tables 1 and 2, in each of Examples 1 to 15, which contained a branched ester compound having 5 to 13 carbon atoms and derived from a carboxylic acid having a branched chain, and an alcohol, effect of the branched ester compound and the phenol compound monomer makes it possible to extend the bench life further without lowering the final strength of the mold.

The invention claimed is:

1. A process for producing a mold by putting, into a pattern, a mixture obtained by adding a curing agent composition and a water-soluble phenol resin to a foundry sand, and shaping the mixture,
   wherein the curing agent composition comprises a branched ester compound having 8 to 9 carbon atoms; and
   wherein the branched ester compound is derived from a carboxylic acid having a branched chain and an alcohol.

2. The process for producing a mold according to claim 1, wherein the branched ester compound has a structure represented by the following general formula (I):

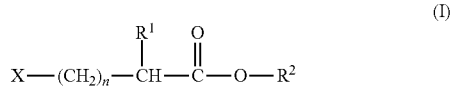

(I)

wherein n is an integer of 1 to 5, X is H or $R^3OCO-$, and $R^1$, $R^2$ and $R^3$, which may be the same or different, are each an alkyl group having 1 to 4 carbon atoms.

3. The process for producing a mold according to claim 1, wherein the branched-chain-having carboxylic acid has 6 to 7 carbon atoms.

4. The process for producing a mold according to claim 1, wherein the alcohol has 1 to 2 carbon atoms.

5. The process for producing a mold according to claim 1, wherein the branched ester compound is one or more species selected from dimethyl 2-ethylsuccinate, dimethyl 2-methylglutarate, dimethyl 2-methyladipate, and methyl 2-ethylhexanoate.

6. The process for producing a mold according to claim 1, wherein the content by percentage of the branched ester compound is 10% or more by weight based on the total weight of the curing agent composition.

7. The process for producing a mold according to claim 1, which further comprises a phenol compound monomer.

8. The process for producing a mold according to claim 1, wherein the phenol compound monomer is one or more selected from resorcin and bisphenol A.

9. The process for producing a mold according to claim 7, wherein the ratio by weight of the phenol compound monomer to the branched ester compound is from 1/99 to 99/1.

10. The process for producing a mold according to claim 7, wherein the content by percentage of the phenol compound monomer is from 1 to 30% by weight based on the total weight of the curing agent composition.

11. The process for producing a mold according to claim 1, which further comprises a different ester compound.

12. The process for producing a mold according to claim 11, wherein the different ester compound is one or more ester compound species selected from cyclic ester compounds, ester compounds derived from a carboxylic acid having a linear structure and an alcohol, and inorganic esters.

13. The process for producing a mold according to claim 11, wherein the ratio by weight of the branched ester compound to the different ester compound is from 1/99 to 99/1.

14. The process for producing a mold according to claim 11, wherein the content by percentage of the different ester compound is from 10 to 95% by weight based on the total weight of the curing agent composition.

15. The process for producing a mold according to any one of claims 1 to 14, wherein when the mixture is put in the pattern, the temperature of the mixture is 30° C. or higher.

\* \* \* \* \*